(No Model.) 2 Sheets—Sheet 2.
F. M. BOWELL.
BICYCLE.
No. 540,139. Patented May 28, 1895.
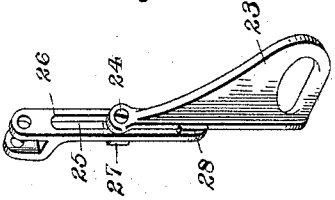
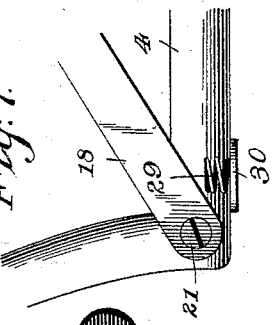
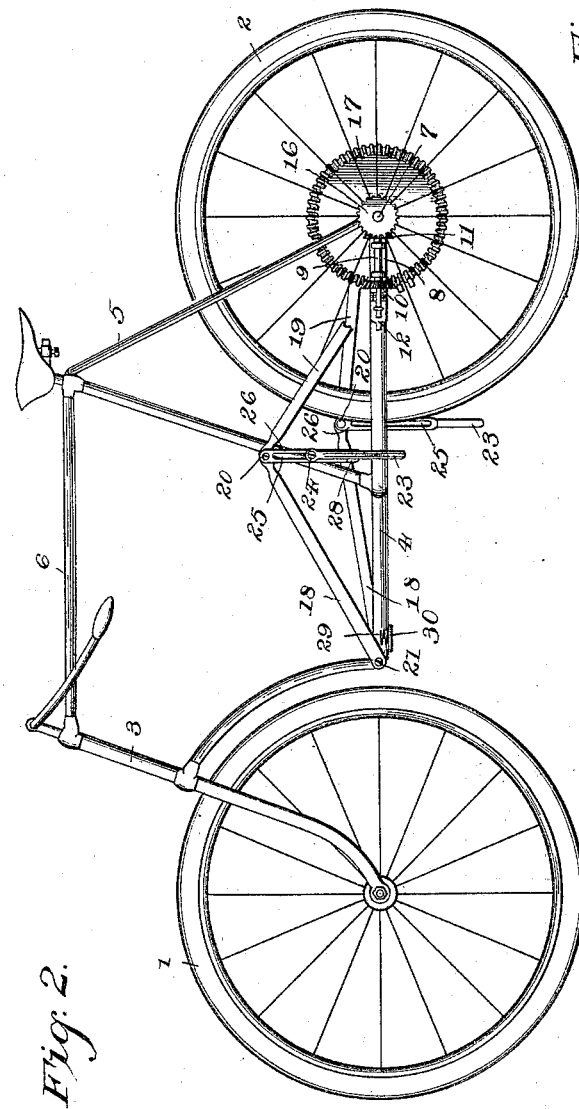
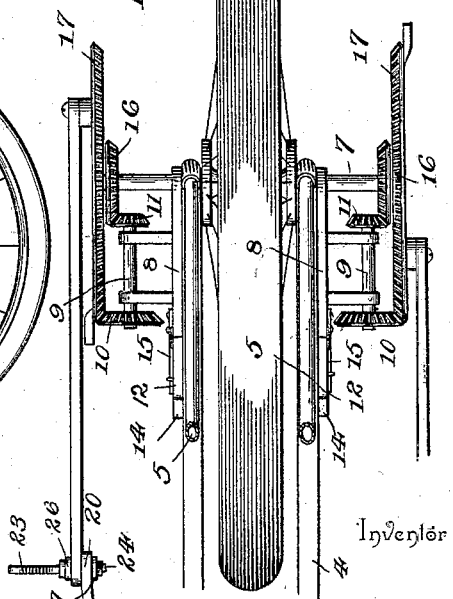
Witnesses
Chas. A. Ford
R. M. Smith
By his Attorneys Francis M. Bowell,
C. A. Snow & Co.
Inventor

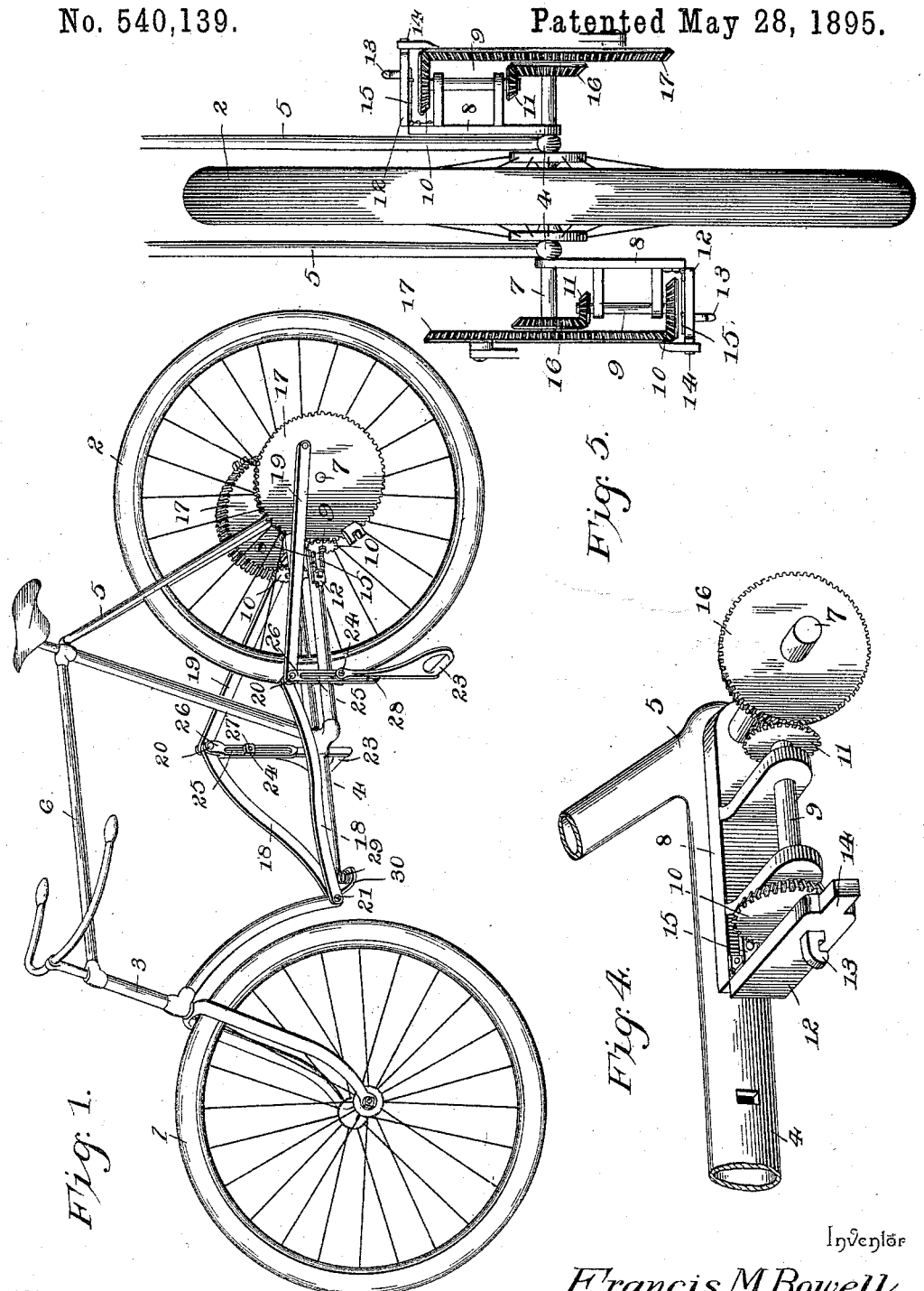

UNITED STATES PATENT OFFICE.

FRANCIS MARION BOWELL, OF ROLLING PRAIRIE, INDIANA.

BICYCLE.

SPECIFICATION forming part of Letters Patent No. 540,139, dated May 28, 1895.

Application filed February 4, 1895. Serial No. 537,257. (No model.)

*To all whom it may concern:*

Be it known that I, FRANCIS MARION BOWELL, a citizen of the United States, residing at Rolling Prairie, in the county of La Porte and State of Indiana, have invented a new and useful Bicycle, of which the following is a specification.

My invention relates to an improvement in bicycles, and has special reference to the means for propelling or driving the same.

The object of my invention is to adapt the toggle lever principle to a bicycle for giving increased power for hill climbing, &c., and to combine with toggle levers, a changeable speed gearing adapted to be thrown into and out of engagement with the driving wheel.

My invention consists in making the rear or driving wheel of a safety bicycle fast upon and keyed to the axle thereof, extending said axle laterally beyond its bearings in the frame and providing it on either end with a small gear keyed thereto, a large gear loose thereon, and a radially arranged pinion-shaft, with pinions thereon, for communicating motion from one to the other of said gears; in combination with said train of gearing, of two sets of toggle levers for imparting motion thereto, one upon each side of the machine; in combination with said gears, of a pivoted frame hinged to the driving wheel axle, and means for throwing said pivoted frame into and out of engagement with the large gear, and the machine frame; and in certain features and details of construction and arrangement of parts hereinafter described and claimed.

In the accompanying drawings, Figure 1 is a perspective view of a safety-bicycle with my improved driving-gear applied. Fig. 2 is a side elevation of the same with the large outside gear removed and with the end of the rear toggle-lever broken away to show the arrangement of the small fixed gear, the hinged pinion-frame, &c. Fig. 3 is an enlarged plan view of a portion of the bicycle, showing the arrangement of the gearing when in position for obtaining speed. Fig. 4 is an enlarged perspective view of the hinged pinion-frame, showing, also, the small fixed gear and a portion of the frame of the machine. Fig. 5 is a rear elevation of the bicycle with the parts occupying the relation which they bear when arranged for hill-climbing or where increased power is required. Fig. 6 is a detached perspective view of one of the pedal-arms and pedals, showing the manner of adjusting the height of the pedal relatively to its pivotal connection with the toggle-levers. Fig. 7 represents a side elevation of a portion of the frame, showing the spring for retracting or lifting the toggle-levers.

Similar numerals of reference indicate corresponding parts in all the figures of the drawings.

1 and 2 represent the wheels of a bicycle of what is known as the safety pattern, and 3, 4, 5, and 6, the usual frame, which may be constructed in any usual or preferred manner.

7 indicates the rear axle which is keyed within the hub of the rear or driving wheel 2, and is adapted to revolve in suitable bearings in the lower ends of the two rear braces 5, 5, of the frame.

8 indicates a pivoted pinion-frame, hinged to and adapted to revolve around the axle 7, just outside of the bearings above described. The hinged frame 8, is provided with suitable, laterally projecting ears or bearings adapted to receive a radially arranged pinion-shaft 9, which is provided at either end, outside of said ears or bearings, with beveled pinions 10 and 11, fast thereon. To the outer end of the hinged pinion-frame is pivoted a short arm 12, provided with two spurs or catches, one, 13, for engaging a slot or perforation, in the lower frame bar 4, and the other 14, for the purpose of engaging said pinion frame with the large driving gear, hereinafter described.

The arm 12, as above stated, is hinged to the outer swinging end of the pinion frame 8, and is operated upon by a spring 15, connected to the pinion-frame, the tension of said spring being exerted to keep the arm 12, normally in a position indicated in Fig. 5.

A small beveled gear wheel 16, is mounted upon the axle 7, and keyed thereto, in such position as to mesh with and be driven by the beveled pinion 11, on the inner end of the radially arranged shaft 9, above described. 17 represents the large or main driving gear of the train. It is mounted loosely upon the shaft or axle 7, just outside of the small gear 16, and meshes with the pinion 10, on the radially arranged shaft, for imparting motion thereto, under one arrangement of the gearing. The large gear 17, is provided at one point on its periphery with a couple of spurs, or with a pocket or recess for the reception of the spur or catch 14, on the pivoted arm 12, carried by the pinion frame.

18 and 19, represent a pair of toggle levers having a common pivot 20, and pivoted at their outer ends, one to the frame of the machine at 21, and the other to a crank-pin on the large gear 17, as shown.

23 indicates one of the pedals of the machine, which may be made in any usual or preferred form adapted to receive the foot of the rider. This pedal 23, is provided with a short stud shaft 24, at its upper end, which is adapted to slide up and down in an elongated slot 25, in a swinging-arm 29, pivoted to the toggle levers 18, and 19, upon their common pivot 20, as shown.

27 is a nut for clamping the pedal and its supporting arm together when adjusted to the desired height.

A stop 28 projecting laterally from the slotted arm 26, serves to limit the longitudinal swinging movement of the pedal 23.

Other parts of the bicycle not hereinabove particularly described may be constructed in any usual or preferred manner.

I will now proceed to describe the operation of the gearing. If it is desired to have speed for smooth level roads, coasting, &c., the arm 12 of the pinion-frame 8, is swung inward until the stop 13, engages the slot or perforation in the lower frame-bar 4. The large gear 17, now being revolved by means of the toggle-levers 18, and 19, engages the pinion 10, on the radially arranged shaft 9, thereby driving said shaft, and through the medium of the intermeshing pinion 11, and the small gear keyed to the drive-wheel axle, imparting motion to said drive-wheel. It will be obvious, that the amount of speed attained by such an arrangement of gearing, can be regulated, at will, by changing the sizes of the various gears and pinions which make up the system described. It is customary to proportion the driving gears of a bicycle, so that the driving-wheel will be revolved twice, to one revolution or downward motion of the foot. When it is desired to obtain power for hill climbing, &c., the pivoted arm 12, at the outer end of the pinion frame is swung outward until the spur or catch 14, engages the pocket or recess on the periphery of the large gear wheel. The wheel 17, upon being revolved, in the manner heretofore described, carries the pivoted pinion-frame along with it, and the pinions 10 and 11 being held stationary relatively to said frame and the large gear 17, are caused to drive the small gear 16, and the driving wheel 2, at the same speed at which said large gear 17 travels.

29 indicates a short spiral spring interposed between the lower face or edge of the toggle-lever 18 and a fixed support or bracket 30, on the machine frame, its purpose being to cushion and limit the downward movement of said lever.

The gearing just described together with the means for adjusting the same is duplicated on each side of the machine, and the two sets of gearing are arranged in such relation to each other that when the pedal on one side of the machine is depressed, that on the other side will be elevated in the usual manner.

Various changes in the form, proportion, and the minor details of construction may be resorted to without departing from the spirit or sacrificing any of the advantages of this invention.

Having described my invention, I claim—

1. In a bicycle, the combination with the driving wheel keyed to its axle, the small beveled gear fast on one end of said axle outside of the frame, and a large beveled gear mounted loosely thereon and also located outside the frame, of a pinion frame mounted loosely on said axle at one end, a radially arranged shaft carried by said pinion frame, a pair of beveled pinions mounted on said radial shaft and meshing with the large and small bevel gears, and means for securing said pinion frame to and releasing it from the main frame of the machine, substantially as described.

2. The combination with the rear driving axle of a bicycle, of a small beveled gear keyed thereto outside of the frame, a large bevel gear mounted loosely thereon outside of said small gear, a pinion frame mounted loosely on said axle, a radially arranged shaft carried by said pinion frame, beveled pinions arranged at opposite ends of said radial shaft for communicating motion from one to the other of said gears, means for engaging said pinion frame with and releasing it from the machine frame, and the toggle levers for imparting motion to said large beveled gear, substantially as described.

3. The combination with the rear driving axle of a bicycle, of a fixed bevel gear and a loose bevel gear mounted thereon outside of the machine frame, a pinion frame mounted loosely upon the axle outside of the machine frame, bevel pinions mounted upon said radial shaft and meshing with said fixed and loose gears for communicating motion from one of said gears to the other, and means, substantially as described, for throwing said pinion frame into and out of engagement with the large gear for giving increased power for hill climbing, &c., or with the machine frame for affording increased speed, substantially as described.

4. The combination with the rear driving axle of a bicycle, of a fixed gear and a loose gear mounted thereon outside of the machine frame, a pinion frame mounted loosely upon the axle outside of the machine frame, a radially arranged shaft mounted in bearings on the pinion frame, pinions carried thereby for communicating motion from one of said gears to the other, and means, substantially as described, for throwing said pinion frame into engagement with the stationary frame of the bicycle or with the loose gear on the drive-wheel axle for giving increased speed to the driving wheel or affording increased power, substantially as described.

5. In a bicycle driving mechanism, the combination with the driving wheel, and the axle keyed thereto, of a fixed gear and a loose gear mounted upon said axle, a pinion frame mounted loosely on said axle, a radially arranged shaft carried by said pinion frame, pinions mounted upon said shaft at each end for transmitting motion from the loose to the fixed gear, and a coupling arm hinged to said pinion frame and provided with two spurs or catches, one for engaging the machine frame and the other for engaging the loose gear, substantially as and for the purpose specified.

6. In a bicycle, the combination with the driving wheel fast upon its axle, a small gear keyed to said axle, and a large gear mounted loosely thereon, of a pinion frame having a radially arranged shaft, a pair of pinions carried thereby, one of which meshes with the large gear and one with the small gear, a spring-actuated arm hinged thereto and provided with a catch for engaging the machine frame, and means for connecting the pinion frame to the large gear substantially as described.

In testimony that I claim the foregoing as my own I have hereto affixed my signature in the presence of two witnesses.

FRANCIS MARION BOWELL.

Witnesses:
O. L. GALBRETH,
MORRIS E. BARNALLE.